United States Patent [19]
Fukano et al.

[11] Patent Number: 5,971,296
[45] Date of Patent: Oct. 26, 1999

[54] ELECTRIC LINEAR VOICE COIL ACTUATED SUCK BACK VALVE

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 09/032,994

[22] Filed: Mar. 2, 1998

[30] Foreign Application Priority Data

| Mar. 5, 1997 | [JP] | Japan | 9-050017 |
| Jan. 19, 1998 | [JP] | Japan | 10-008077 |

[51] Int. Cl.⁶ .................................................. B05B 15/00
[52] U.S. Cl. ..................... 239/119; 239/106; 239/586; 222/571; 251/63.5; 251/331; 251/129.15
[58] Field of Search .................................. 239/104, 106, 239/119, 583, 586; 222/571; 251/63.5, 331, 129.15

[56] References Cited

U.S. PATENT DOCUMENTS

| 3,895,748 | 7/1975 | Klingenberg | 222/571 |
| 4,354,519 | 10/1982 | Bjorklund . | |
| 4,394,945 | 7/1983 | Taylor, Jr. | 222/571 |
| 4,597,719 | 7/1986 | Tano | 222/571 X |
| 5,134,962 | 8/1992 | Amada et al. | 222/571 X |
| 5,379,985 | 1/1995 | Waij et al. . | |
| 5,386,849 | 2/1995 | Gilchrist et al. | 251/331 X |
| 5,423,482 | 6/1995 | Mueller et al. | 239/119 X |
| 5,460,201 | 10/1995 | Borcea et al. . | |

FOREIGN PATENT DOCUMENTS 8-10399  3/1996  Japan .

OTHER PUBLICATIONS

Patent Abstracts of Japan, vol. 018, No. 199 (E–1534), Apr. 7, 1994, JP 06 005506, Jan. 14, 1994.

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57] ABSTRACT

A suck back valve in which the response speed of a diaphragm is improved and in which control becomes assured, wherein there is no concern of changes occurring in an amount of sucked fluid, and wherein a system employing the suck back valve is kept small in scale, thereby enabling ease of installation.

13 Claims, 6 Drawing Sheets

ELECTRIC LINEAR VOICE COIL ACTUATED SUCK BACK VALVE

BACKGROUND OF THE INVENTION

1. Field of the Invention

The present invention relates to a suck back valve which, for example, prevents liquid drip from occurring in a fluid supply port, by sucking back a fluid which flows through a fluid passage in accordance with a displacement action of a diaphragm, yet which is capable of stabilizing the suck back amount of the fluid.

2. Description of the Related Art

The suck back valve has been hitherto used, for example, in a production process for forming semiconductor wafers. The suck back valve has a function to prevent so-called liquid drip, i.e. a phenomenon in which a minute amount of coating liquid drips toward the semiconductor wafer from a supply port when the supply of coating liquid to the semiconductor wafer is stopped.

Figure 6:
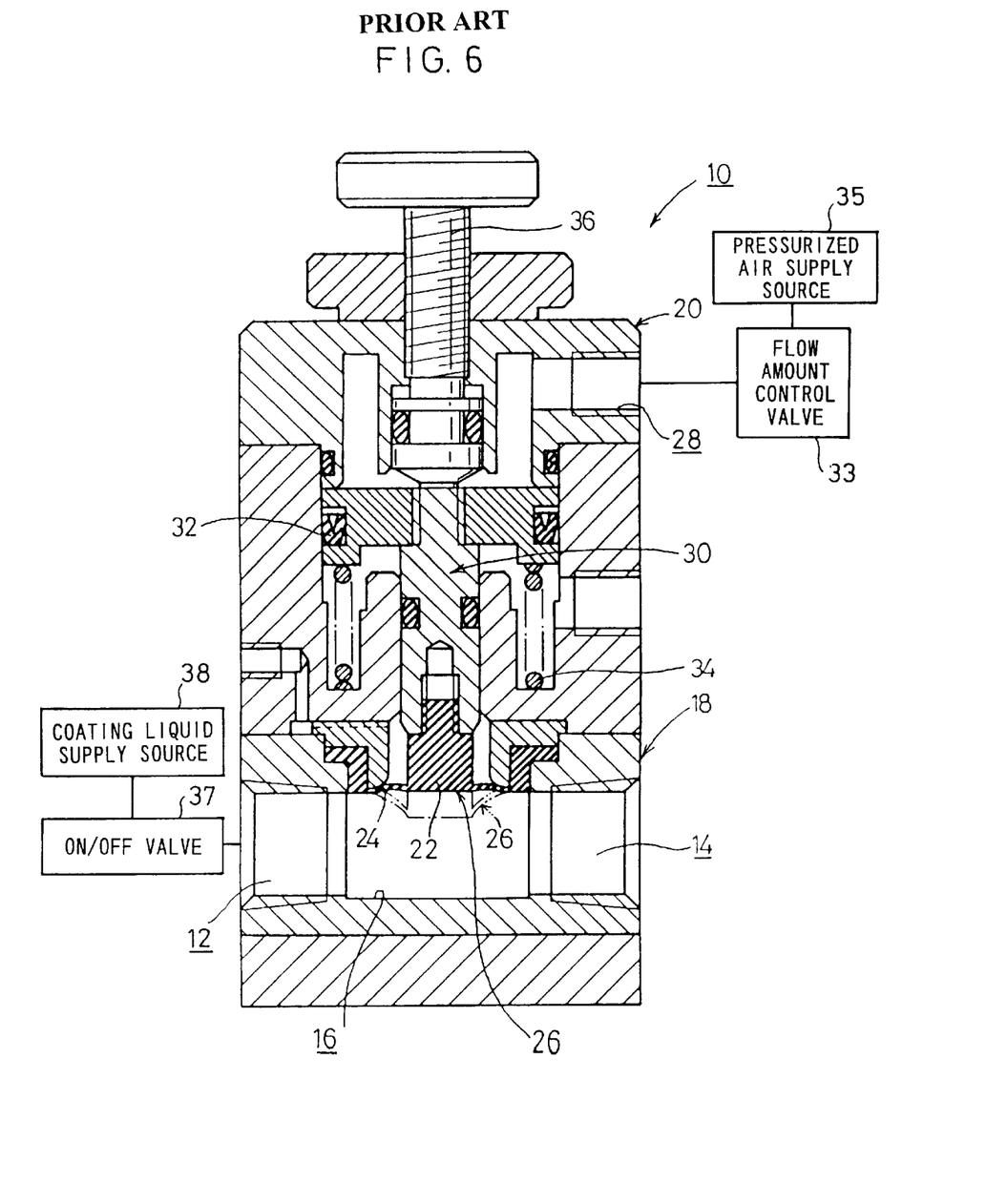
FIG. 6 is a vertical cross-sectional view of the suck back valve according to a conventional technique.

A suck back valve according to a conventional technique is shown by FIG. 6, further details of which may be seen, for example, in Japanese Utility Model Publication No. 8-10399.

The suck back valve 10 includes a main valve body 18 formed with a fluid passage 16 for making communication between a fluid-introducing port 12 and a fluid-discharging port 14, and a bonnet 20 coupled to an upper portion of the main valve body 18. A diaphragm 26, which comprises a thick-walled section 22 and a thin-walled section 24, is provided at a central portion of the fluid passage 16, wherein the overall surface of the thick-walled section 22 and thin-walled section 24 of the diaphragm is formed so as to face the fluid passage 16.

A piston 30 is fitted to the diaphragm 26, wherein a v-packing 32, which is slidable on an inner wall surface of the main valve body 18 and which functions as a seal, is installed on the piston 30. Further, a spring 34, which constantly presses the piston upwardly, is provided in the main valve body 18. A pressurized air supply port 28 is formed in the bonnet 20. Reference numeral 36 illustrates an adjustment screw abutting with the piston 30, for adjusting a flow amount of coating liquid to be sucked back by the diaphragm 26, based on adjustment of a displacement amount of the piston 30.

Further, reference numeral 33 shows a flow amount control valve, wherein a pressurized air supply source 35 is connected to the pressurized air supply port 28 through the flow amount control valve 33. In addition, a coating liquid supply source 38 is connected to the fluid inlet port 12 through the ON/OFF valve 37.

An explanation of operation of the suck back valve 10 constructed as described above, shall now be given in outline. First, the ON/OFF valve 37 assumes an ON state, and coating liquid is supplied toward the fluid outlet port 14 from the coating liquid supply source 38 and via the ON/OFF valve 37 and the fluid inlet port 12. At this time, the flow amount control valve 33 is controlled, and as pressurized air is supplied from the pressurized air supply source 35 to the pressurized air supply port 28, the piston 30 is displaced downward by the pressure of the pressurized air, wherein the diaphragm 26 connected to the piston 30 projects into the fluid passage 16, as shown by the two-dot-chain line in FIG. 6.

When the ON/OFF valve 37 assumes an OFF state, the flow of coating liquid in the fluid passage 16 is halted, whereas when the flow amount control valve 33 is controlled and supply of pressurized air to the pressurized air supply port 28 from the pressurized air supply source 35 is halted, a condition is reached in which the piston 30 and diaphragm 26 are raised in unison under an action of the elastic force of the spring 34. An end of the adjusting screw 36 abuts with the piston 30, and along with controlling the displacement thereof, the diaphragm 26 is restored to the position shown by the actual lines in FIG. 6, resulting in lowering of the pressure in the passage 16. More specifically, a predetermined amount of coating liquid remaining in the fluid passage 16 is sucked by a negative pressure action of the diaphragm 26, whereby liquid dripping at the coating liquid supply port connected to the fluid outlet port 14 side is prevented.

Notwithstanding, in the above-described conventional suck back valve 10, a flow amount control valve 33 for controlling an amount of pressurized fluid supplied to the pressurized air supply port 28 becomes necessary, and moreover, pipe connecting operations for interconnecting the suck back valve 10 and the flow amount control valve 33 add complexity. Further, there is a disadvantage that a dedicated space for the system employing the suck back valve becomes large. Further, because pressurized air supplied to the pressurized air supply port 28 is controlled by the flow amount control valve 33, whereby the piston 30 is moved and the diaphragm 26 is displaced, time is required from initiating control of the flow amount control valve 33 until actual displacement of the diaphragm 26 occurs, resulting in a delay in the response speed of the diaphragm 26. Accordingly, the delay in operation from halting of coating liquid supply until the coating liquid is sucked back causes trouble, so that more than a predetermined amount of coating liquid drips onto the semiconductor wafer, with the concern that the expected goal of preventing liquid dripping cannot be achieved.

Furthermore, because the diaphragm 26 is displaced by pressurized air supplied to the pressurized air supply port 28, pressure of the pressurized air supplied from the pressurized air supply source 35 tends to vary, causing a change in the displacement amount of the piston 30, and in turn the amount of coating liquid sucked by the diaphragm 26 also changes. As a result, when supply of coating liquid is halted, coating liquid remaining inside the fluid passage 16 is not sufficiently sucked, with the fear that unwanted dripping of coating liquid onto the semiconductor wafer may occur. On the other hand, if more than the predetermined amount of coating liquid is sucked back, when the suck back valve 10 is used again and supply of coating liquid is reinitiated, there is the problem that additional time is spent until coating liquid begins dripping onto the semiconductor wafer.

Still further, the suck back valve 10 and the ON/OFF valve 37 have to be disposed separately from one another, and a pipe connecting operation for interconnecting the suck back valve 10 and the ON/OFF valve 37 becomes necessary. Hence, there is the defect that a dedicated space for installation of the system employing the suck back valve 10 becomes increasingly large.

SUMMARY OF THE INVENTION

A general object of the present invention is to provide a suck back valve capable of improving the response speed of a diaphragm in accordance with displacement thereof by an electric linear actuator, yet wherein the displacement amount and displacement speed of the diaphragm are accurately controlled, so that the amount of sucked back liquid is precisely controlled and liquid drip is prevented, together with preventing sucking back of more than a predetermined amount of fluid, and enabling swift initiation of the supply of fluid.

A main object of the present invention is to provide a suck back valve capable of keeping the system small in scale and enabling ease of installation, by integral construction of the suck back valve and an ON/OFF valve.

Another object of the present invention is to provide a suck back valve enabling accurate and certain displacement of a diaphragm with a simplified structure, by constructing an electric linear actuator from a linear voice coil type displacement device, while also enabling small scale construction thereof.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
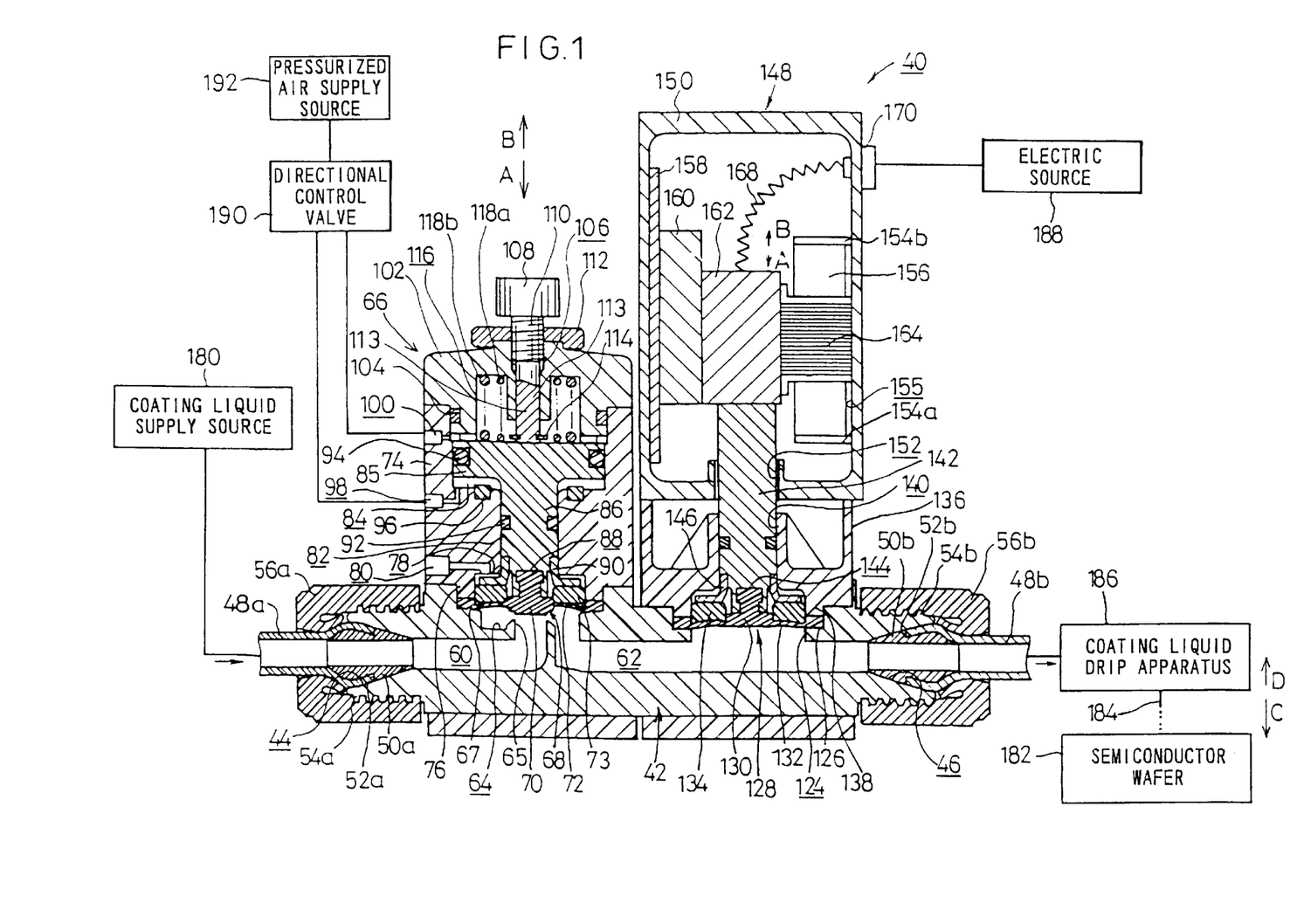
FIG. 1 is a vertical cross-sectional view of a suck back valve in accordance with a first embodiment of the present invention.

In FIG. 1, reference numeral 40 shows the suck back valve according to the first embodiment of the present invention. The suck back valve 40 is equipped with a longitudinally formed valve body 42, the valve body 42 having a first port 44 formed at one end thereof and a second port 46 formed at the other end thereof. Connecting elements 50a, 50b which fit into the ends of tubes 48a, 48b are disposed at the respective ports 44, 46, wherein ends of the tubes 48a, 48b are fitted onto steps 52a, 52b formed on the outer circumference of the connecting elements 50a, 50b, thus determined the positioning thereof.

Male screw threads 54a, 54b are cut into both end parts of the valve body 42, wherein by threadedly fitting lock nuts 56a, 56b over the male screw threads 54a, 54b, the tubes 48a, 48b become press-fitted to and held by the connecting elements 50a, 50b.

A fluid passage 60 communicating with one of the tubes 48a, and another fluid passage 62 communicating with the other tube 48b, are defined inside the valve body 48. The respective fluid passages 60, 62, as shown by FIG. 1, bend upwardly inside of the valve body 42, and communicate with a cavity 64 defined in the valve body 42, whereas a seat 65 is formed along an opening port of the fluid passage 60 in the cavity 64. A step 67 is also formed along a wall portion formed by the cavity 64.

An ON/OFF valve 66 faces the opening port of the fluid passage 60. The ON/OFF valve 66 comprises an ON/OFF valve diaphragm 68 fitted onto the step 67. A thick-walled portion 70 is formed at a center region of the ON/OFF valve diaphragm 68, and a flexible thin-walled portion 72 is formed in surrounding relation to the thick-walled portion 70. As a result, the thick-walled portion 70 is displaceable in the directions of arrows A and B by flexure of the thin-walled portion 72, and when the thick-walled portion 70 is displaced in the direction of arrow A, the thick-walled portion 70 becomes seated on the seat 65, blocking access to the fluid passage 60, whereas when the thick-walled portion is displaced in the direction of arrow B, communication is established between the fluid passage 60 and the fluid passage 62. A ring-shaped elastomeric member 73, formed for example from synthetic rubber or natural rubber, engages an upper surface of the thin-walled portion 72.

The ON/OFF valve 66 includes a body 74, with a projection 76 formed on a lower part of the body 74 and fitted into the cavity 64, wherein a circumferential edge of the ON/OFF valve diaphragm 68 is gripped between the projection 76 and the step 67. A cavity 78 is formed at the lower part of the body 74, the cavity 78 communicating to the outside of the body 74 via a passage 80. The passage 80 serves for introducing air to the interior of the cavity 78, as well as exhausting air from the cavity 78, as the ON/OFF valve diaphragm 68 displaces in the directions of arrows A and B. The cavity 78 communicates with a hole 82 which extends along an axial line of the body 74, the hole 82 communicating with a further cavity 84 defined in an upper part of the body 74. A rod 86 having a flange 85 formed on an upper part thereof is slidably inserted in the hole 82 and cavity 84, wherein an upper part of the thick-walled portion of the ON/OFF valve diaphragm 68 is fitted into a cavity 88 defined on a lower end of the rod 86.

A radially expanding, trumpet-shaped support member 90 is affixed to an outer circumference of the lower end of the rod 86. The support member 90 engages an upper surface of the elastomeric member 73, serving a function for supporting the elastomeric member 73 with respect to the thin-walled portion 72 of the ON/OFF valve diaphragm 68.

O-rings 92, 94 are disposed along outer circumferences of the rod 86 and the flange 85 for preventing leakage of pressurized fluid. Further a damper 96 is disposed on a bottom part formed by the cavity 84. A passage 98 communicating with the cavity 84, and another passage 100 communicating with the cavity 84, are defined in the body 74. A cover member 102 fitting into the cavity 84 is disposed on an upper part of the body 74, and a further o-ring 104, for preventing leakage of pressurized fluid from the space around the wall of the cavity 84, is disposed on the cover member 102. A screw hole 106 is defined in the center of the cover member 102, wherein an adjustment screw 110 having a grip 108 formed at one end thereof is threadedly inserted into the screw hole 106. The adjustment screw 110 is stopped at a predetermined screw-in position by engagement with a lock nut 112, whereby a position of abutment between a pin 113 arranged at the other end of the adjustment screw 110 and the rod 86 is adjusted by variably increasing/decreasing the screw-in amount, thus controlling the displacement range of the rod 86 in the direction of arrow B. A ring member 114 is disposed at the other end of the pin 113, wherein the pine is stopped from being pulled out from the screw hole 106 by means of the ring member 114.

An annular cavity 116 is defined in surrounding relation to the pin 113 in the lower part of the cover member 102, wherein ends of a pair of doubly-constructed differing radii springs 118a, 118b are seated on the ceiling formed by the annular cavity 116, and the other ends of the springs are seated on an upper surface of the rod 86. Accordingly, the rod 86 is ordinarily biased by the springs 118a, 118b in the direction of arrow A.

A hole 124 which communicates with the fluid passage 62 is formed on an upper part of the valve body 42, and a step 126 is formed along a wall of the hole 124. A circumferential edge of the diaphragm 128 is supported on the step 126. A thick-walled portion 130 is formed on the diaphragm 128, and a thin-walled portion 132 is formed around the outer periphery of the thick-walled portion 130. A ring-shaped elastomeric member 134 engages an upper surface of the thin-walled portion 132.

A support member 136 is disposed on an upper part of the valve body 42. A projection 138 is formed on a lower part of the support member 136, wherein an edge of the diaphragm 128 is gripped between the projection 138 and the step 126. A guide hole 140 is defined centrally in the support member 136, and a cylindrically shaped rod 142 is movably inserted through the guide hole 140. As a result, the rod 142 is displaced while guided by a wall formed by the guide hole 140. A cavity 144 is defined at a lower end of the rod 142, wherein an upper part of the thick-walled portion 130 of the diaphragm 128 is engaged in the cavity 144. A radially-expanding trumpet-shaped support member 146 is affixed to the outer periphery of the lower part of the rod 142. The support member 146 engages the upper surface of the elastomeric member 134, serving a function for supporting the elastomeric member with respect to the thin-walled portion 134 of the diaphragm.

A linear voice coil type displacement device 148, which is an electric linear actuator, is disposed on an upper part of the support member 136. The linear voice coil type displacement device 148 includes a housing 150, a lower part of the housing 150 having a hole 152 defined therein through which the rod 142 is inserted. A permanent magnet 156 is affixed to one side interior wall of the housing 150 through a pair of supports 154a, 154b extending in the directions of arrows A and B. An outer wall surface of the permanent magnet 156, and an inner wall surface of the housing 150, are kept at a predetermined interval separation by the supports 154a, 154b, wherein the space between the permanent magnet 156 and the housing is formed as a gap 155. A fixed magnetic field is generated in the gap 155 directed from the permanent magnet 156 toward the inner wall surface of the housing 150. A rail 158 is affixed to another inner wall surface of the housing 150 extending in the direction of arrows A and B, with a guide 160 slidably disposed on the rail 158. A displacement element 162 is affixed to the guide 160, with an end of the rod 142 being affixed to a lower part of the displacement element 162. An electromagnetic coil 164 is affixed to the displacement element 162, wherein the electromagnetic coil 164 surrounds the permanent magnet 156. Accordingly, the electromagnetic coil 164 is displaceable integrally with the displacement element 162 in directions of arrows A and B. In this case, the electrical wires (windings) which form the electromagnetic coil 164 extend in a direction perpendicular to the fixed magnetic field which is generated in the gap 155 by the permanent magnet 156. On the other hand, a harness 168 is disposed on one end of the displacement element 162, wherein the harness, although not shown, is electrically connected to the electromagnetic coil 164. The harness 168 is formed as a flexible spiral, and another end of the harness 168 is connected to a connector 170 disposed on a wall of the housing 150.

The suck back valve 40 in accordance with the first embodiment is constructed basically as described above. Next a description shall be given of the operation thereof.

First, a coating liquid supply source 180 storing therein a coating liquid for coating a semiconductor wafer 182 is connected to the tube 48a communicating with the first port 44 of the suck back valve 40. On the other hand, a coating liquid drip apparatus 186 having disposed therein a coating liquid drip nozzle 184 which faces the semiconductor wafer 182 is connected to the tube 84 of the second port 46. Further, an electric source 188 is connected to the connector 170. Furthermore, a pressurized air supply source 192 is connected to passages 98 and 100 through a directional control (switchover) valve 190.

After the above preparatory steps are completed, when the directional control valve 190 is switched for introducing pressurized air from the pressurized air supply source 192 through the passage 98, and to the cavity 84, as shown in FIG. 1, the rod 86 displaces in the direction of arrow B in opposition to the elastic force of the spring members 118a, 118b, wherein the thick-walled portion 70 of the ON/OFF valve diaphragm 68 separates from the seat 65, establishing communication between fluid passages 60 and 62. Upon energization of the coating liquid supply source 180, coating liquid is supplied from the one tube 48a through passages 60, 62, to the coating liquid drip apparatus 186, whereby it is dripped from the nozzle 184 onto the semiconductor wafer 182. As a result, a coating layer having a desired thickness is formed on the semiconductor wafer 182.

Figure 2:
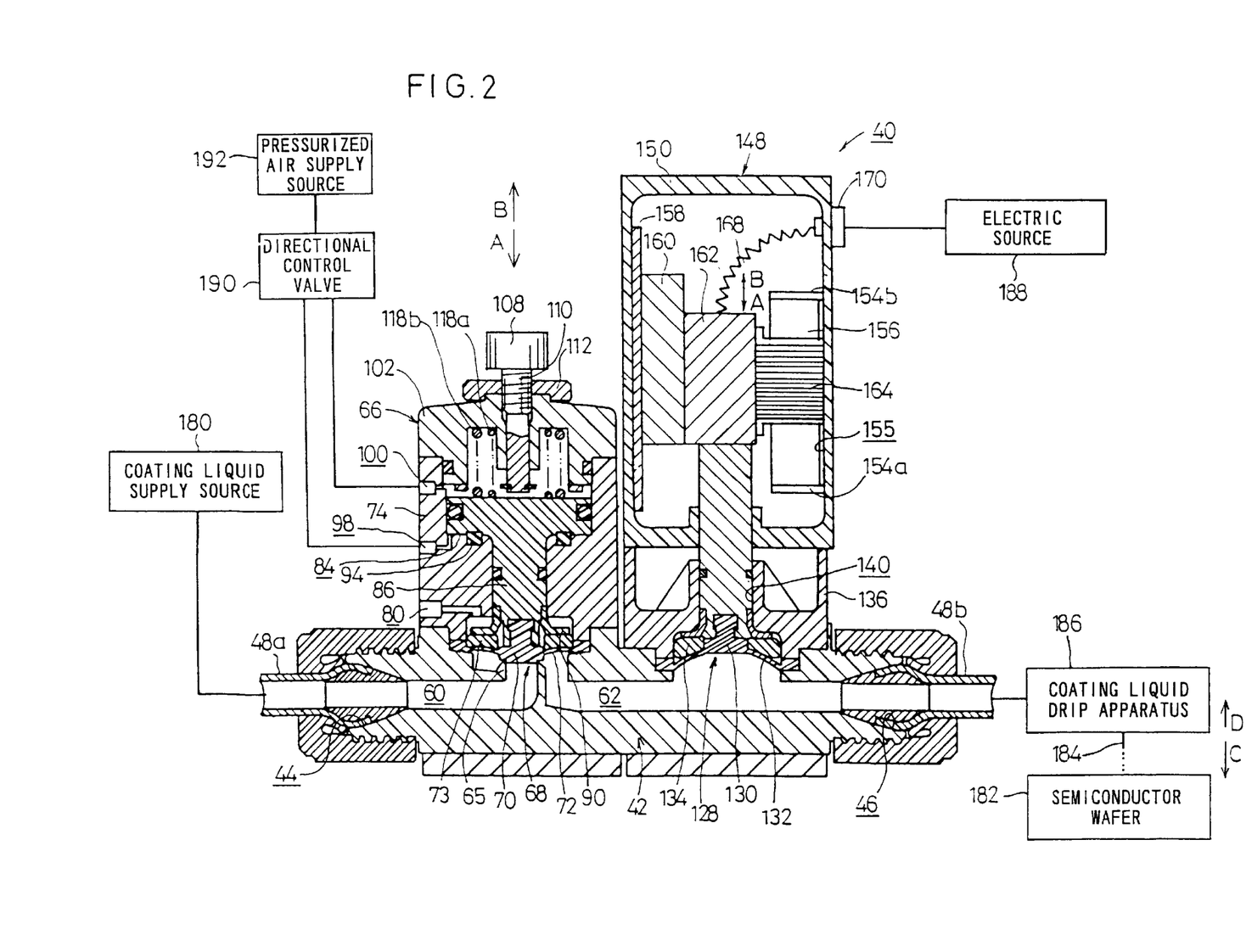
FIG. 2 is a vertical cross-sectional view showing the suck back valve of FIG. 1 under use.

After a predetermined amount of coating liquid is applied to the semiconductor wafer 182, when the directional control valve 190 is switched and pressurized air is introduced from the pressurized air supply source 192 to the passage 100, as shown in FIG. 2, the rod 86 displaces in the direction of arrow A under action of the pressurized air and the elastic force of the spring members 118a, 118b, whereby the thick-walled portion 70 of the ON/OFF valve diaphragm 68 is seated onto the seat 65, thus interrupting communication between the fluid passages 60 and 62. Accordingly, dripping of coating liquid from the nozzle 184 of the coating liquid drip apparatus 186 with respect to the semiconductor wafer 182 is halted. In this case, because coating liquid immediately preceding that which has dripped onto the semiconductor wafer 182 remains inside the nozzle 184, there is a fear that unwanted liquid dripping may occur.

At that point, the electrical source 188 is energized, and when a current is delivered to the electromagnetic coil 164, an electric current directed perpendicular to the fixed magnetic field which is generated in the gap 155 by the permanent magnet 156 is caused to flow in the electromagnetic coil 164. As a result, a force is generated by the electromagnetic coil 164 in the direction of arrow B in accordance with Flemming's left-hand rule. By appropriate adjustment of the size and/or polarity of the current supplied to the electromagnetic coil 164, a desired direction, size or continuity time of the force can be adjusted. In this manner, when the thick-walled portion 130 of the diaphragm 128 displaces in the direction of arrow B, a negative pressure is generated by the diaphragm 128, whereby a predetermined amount of coating liquid inside the fluid passage 62 is sucked by action of the negative pressure. As a result, any coating liquid inside the nozzle 184 of the coating liquid drip apparatus 186 is returned in the direction of arrow D, and accordingly unwanted dripping of liquid onto the semiconductor wafer can be prevented.

In the case that coating liquid is re-supplied to the semiconductor wafer 182, the directional control valve 190 is again switched to introduce pressurized air to the passage 98, whereby the rod 86 is displaced in unison with the thick walled portion 70 of the diaphragm 68 in the direction of arrow B, establishing communication between passages 60 and 62. At this time, when the electric source 188 is energized to supply current to the electromagnetic coil 164 to effect a force in the direction of arrow A, as shown in FIG. 1, the thick-walled portion 130 of the diaphragm 128 displaces integrally with the electromagnetic coil 164 in the direction of arrow A, pushing out coating liquid from the side of the fluid passage 62. As a result, the coating liquid which was returned from the nozzle 184 in the direction of arrow D when liquid dripping was halted is now supplied in the direction of arrow C, wherein coating liquid is swiftly dripped again from the nozzle 184 onto the semiconductor wafer 182.

As set out above, in the first embodiment, because a linear voice coil type displacement device 148 is used for displacing the diaphragm 128, in comparison to the conventional technique using pressurized fluid, there is no need for a fluid amount control valve or for pipes which interconnect the flow amount control valve and the suck back valve 40, so that the system employing the suck back valve 40 can be constructed on a small scale. Further, because the suck back diaphragm 128 is driven by electrical controls, and not by pressurized fluid, the response time of the diaphragm 128 is shortened, enabling operation thereof from the time that fluid supply is halted until the fluid is sucked, to be rapidly effected. Further, because the controls are electrical, control of the apparatus per se is reliably assured.

Further, no adverse effect is received from pressure variations of the pressurized air supply source, so that when the diaphragm 128 is displaced, the amount of fluid sucked by the suck back valve 40 is kept uniform, and when supply of fluid is halted, unwanted dripping of fluid onto the semiconductor wafer 82, or a similar work, can be reliably prevented. Furthermore, when a fluid is supplied to the work, because the displacement amount of the diaphragm 128 is uniform, a stable amount of fluid can be made to drip.

Next, a suck back valve in accordance with a second embodiment of the present invention shall be described with reference to FIG. 3. Structural elements which are the same as those of the first embodiment are designated by like reference numerals and detailed discussion thereof shall be omitted.

Figure 3:
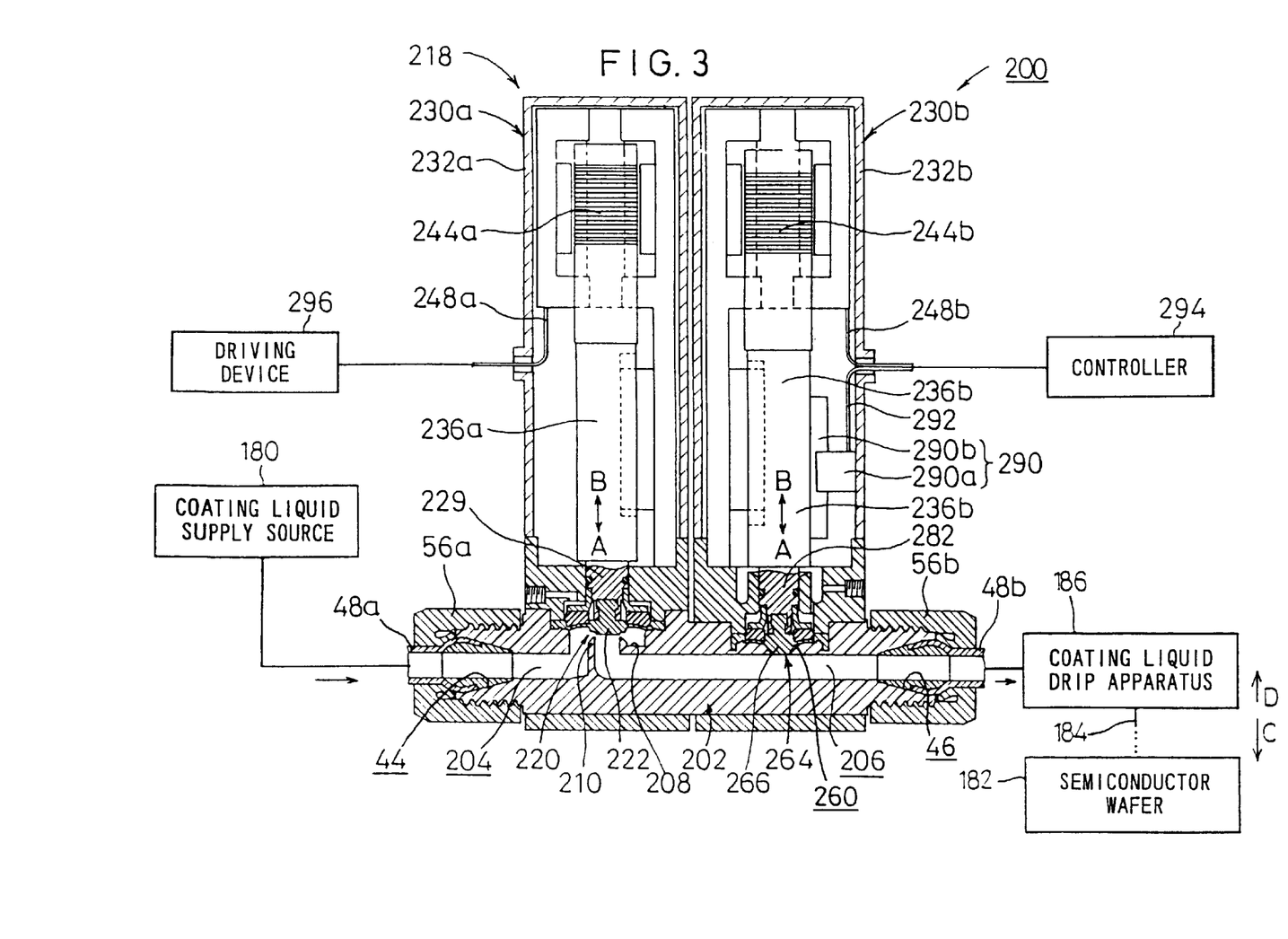
FIG. 3 is a vertical cross-sectional view of a suck back valve in accordance with a second embodiment of the present invention.

In FIG. 3, reference numeral 200 indicates the suck back valve in accordance with the second embodiment. The suck back valve 200 is equipped with a longitudinally formed valve body 202, having formed therein a fluid passage 204 communicating with one tube 48a, and a fluid passage 206 communicating with the another tube 48b, wherein the fluid passages 204 and 206 bend upwardly inside the valve body 202, communicating with a cavity 208 defined in the valve body 202. A seat 210 is formed around an opening of one fluid passage 206 in the cave 208. A step 212 is formed along a wall formed by the cavity 208.

Figure 4:
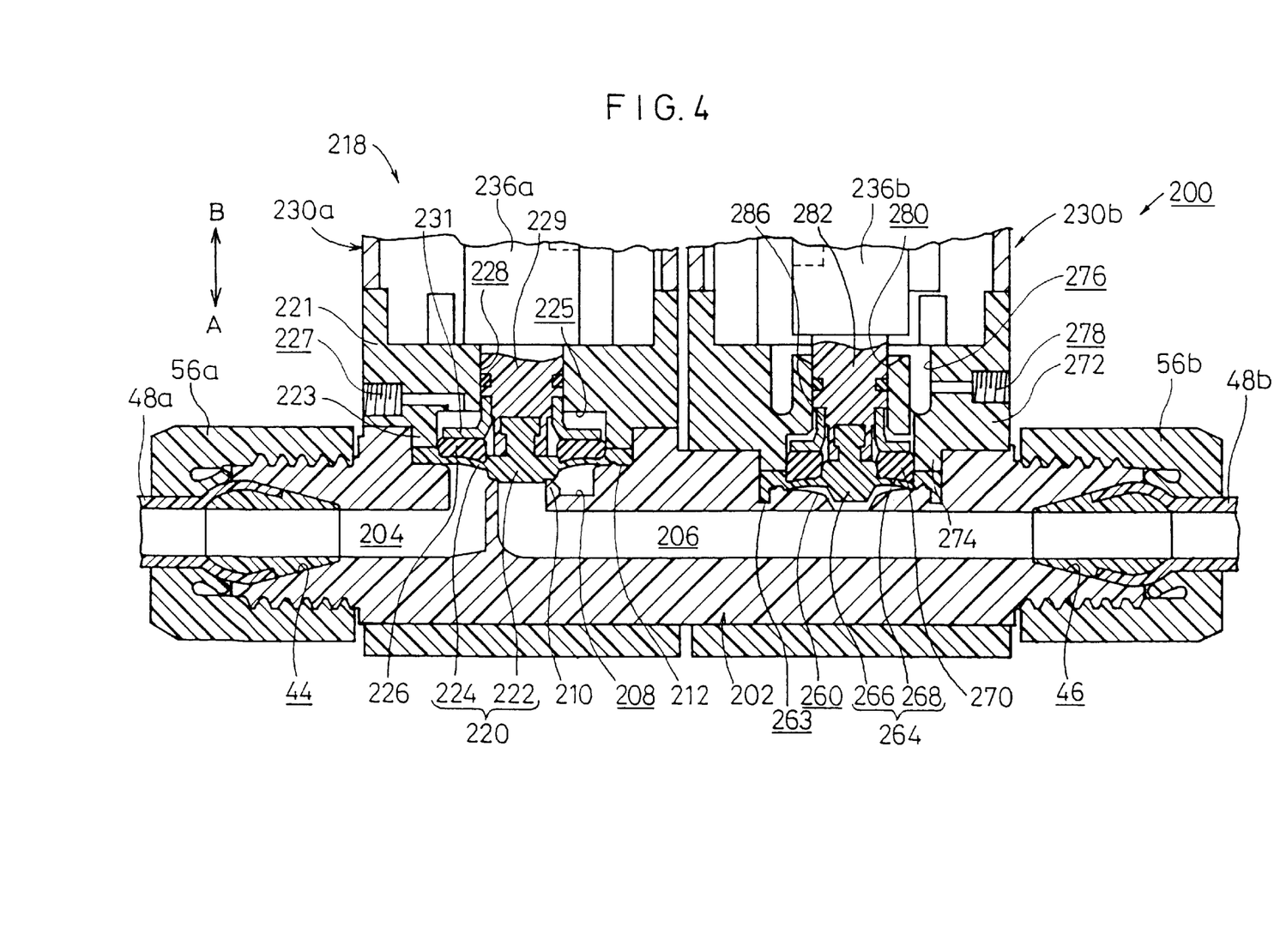
FIG. 4 is a partial expanded vertical cross-sectional view of a diaphragm of the suck back valve of FIG. 3.

An ON/OFF valve 218 faces the opening of the fluid passage 206. As shown in FIG. 4, the ON/OFF valve 218 includes an ON/OFF valve diaphragm 220 engaging the step 212. A thick-walled portion 222 is formed at a center of the ON/OFF valve diaphragm 220, and a flexible thin-walled portion 224 is formed in surrounding relation to the thick-walled portion 222. As a result, the thick-walled portion 222 is displaceable in the directions of arrows A and B by flexure of the thin-walled portion 224, and when the thick-walled portion displaces in the direction of arrow A, the thick-walled portion 222 is seated on the seat 210, blocking access to the passage 206, whereas when the thick-walled portion 222 displaced in the direction of arrow B, communication is established between passages 204 and 206. A ring-shaped elastomeric member 226, formed for example from synthetic rubber or a natural rubber type material, engages an upper surface of the thin-walled portion 224.

A support member 221 is disposed on an upper part of the ON/OFF valve diaphragm 220. A projection 223 is formed on a lower part of the support member 221, wherein an edge of the ON/OFF valve diaphragm is gripped between the projection 223 and the step 212. A chamber 225 is formed in the support member 221, the chamber 225 communicating to the outside through a fluid passage 227. A hole 228 communicating with the chamber 225 is defined centrally in the support member 221. A rod 229 is slidably inserted through the hole 228, wherein an upper part of the thick-walled portion 222 of the ON/OFF valve diaphragm 220 engages a lower part of the rod 229. In addition, a radially expanding trumpet-shaped support member 231 is affixed to an outer circumference of the lower part of the rod 229. The support member 231 engages an upper surface of the elastomeric member 226, and serves a function of maintaining the elastomeric member 226 against the thin-walled portion 224 of the ON/OFF valve diaphragm 220.

Figure 5:
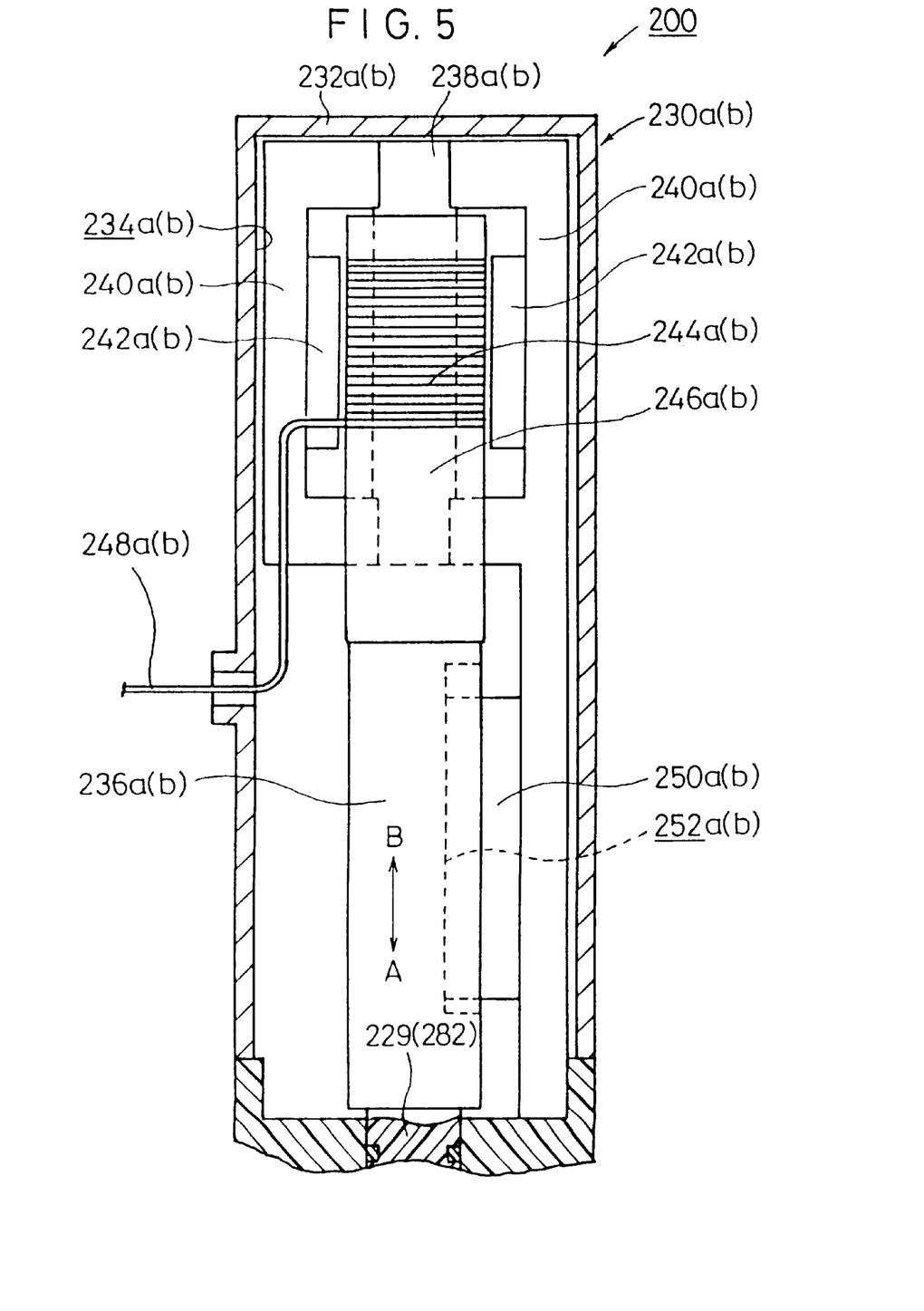
FIG. 5 is a partial expanded vertical cross-sectional view of a linear voice coil type displacement device of the suck back valve of FIG. 3.

Further, a permanent magnet 242a which is attached to an inner wall of the housing 232a through a support member 240a is disposed in the chamber 234a at a predetermined interval separation from a fixed iron core 238a. In this case, a substantially horizontally directed magnetic field is formed in a space between the permanent magnet 242a and the fixed iron core 238a. The fixed iron core 238a is surrounded by a displacement member (bobbin) 246a which is wound by an electromagnetic coil 244a, and wherein the displacement member 246a is displaceable between the fixed iron core 238a and the permanent magnet 242a. The displacement member 246a is disposed for displacement integrally with the stem 236a. Further, reference numeral 248a designates leads which supply current to the electromagnetic coil 244a.

A guide member 250a is disposed along an inner wall surface of the housing 232a through a support member 240a, wherein the guide member 250a serves for guiding the stem 236a by engagement with a guide groove 252a defined along the longitudinal direction of the stem 236a.

On the other hand, as shown in FIG. 4, a radially expanding trumpet-shaped hole 260, which is upwardly directed, is defined in an upper part of the fluid passage 206 side of the valve body 202. A groove 263 is defined circumscribing an edge of the wall formed by the hole 260, wherein an edge of the diaphragm 264 engages the groove 263. A thick-walled portion 266 is formed at a center of the diaphragm 264, and a thin-walled portion 268 is formed in surrounding relation to the thick-walled portion 266. The thick-walled portion 266, and the thin-walled portion 268, are formed to fittably engage with a wall that is constructed around the hole 260, such that when the diaphragm 264 displaces in the direction of arrow A, an end of the thick-walled portion and a wall of the fluid passage 206 become substantially flush along a common surface. A ring-shaped elastomeric member 270 engages the upper surface of the thin-walled portion 268.

A support member 272 is disposed on an upper part of the diaphragm 264. A projection 274 is formed on a lower part of the support member 272. An edge of the diaphragm 264 is gripped between the projection 274 and a bottom of the groove 263. A chamber 276 is formed in the support member 272, wherein the chamber 276 communicates to the outside through a fluid passage 278. Additionally, a guide hole 280 which communicates with the chamber 276 is defined centrally in the support member 272. A rod 282 is slidably inserted through the guide hole 280, and as a result, the rod 282 is displaced while being guided by a wall formed in the guide hole 280. An upper part of the thin-walled portion 266 of the diaphragm 264 engages a lower end of the rod 282, and additionally, a radially expanding trumpet-shaped support element 286 is affixed circumferentially around a lower part of the rod 282. The support element 286 engages an upper surface of the elastomeric member 270, serving a function of maintaining the elastomeric member 270 against the thin-walled portion 286 of the diaphragm 264.

A second linear voice coil type displacement device 230b, which is a suck back valve electric linear actuator, is disposed on an upper part of the support member 272. The second linear voice coil type displacement device 230b, with the exception of an encoder 290 to be discussed hereinafter, is constructed similarly to the first linear voice coil type displacement device 230a (see FIG. 5), and hence in the explanations to follow, structural elements which are the same as those present in the first linear voice coil type displacement device 230a are designated by like reference numerals, only with a letter "b" appended in place of the letter "a", and detailed discussion thereof shall be omitted.

As shown in FIG. 3, an encoder 290 is fixedly disposed inside a housing 232b of the second linear voice coil type displacement device 230b. The encoder 290 comprises a photosensor 290a affixed to a side of the housing 232b, and a glass scale 290b, having scales formed thereon at uniform intervals, which is affixed to the stem 236b In this case, as the stem 236b is displaced, the scales of the glass scale 290b are detected by the photosensor 290a and a detection signal thereof is fed back to the controller 294 through leads 292. Accordingly, based on the detection signal, the displacement amount of the stem 236b can be controlled highly accurately by the controller 294.

The suck back valve 200 according to the second embodiment is constructed basically as described above. Next an explanation shall be given of the operation thereof.

First, the coating liquid supply source 180, storing therein a coating liquid which is to be coated onto a semiconductor wafer 182, is connected to the tube 48a communicating with the first port 44 of the suck back valve 200, whereas the coating liquid drip apparatus 186, having disposed thereon a nozzle 184 for dripping coating liquid onto the semiconductor wafer 182, is connected to the tube 48b which communicates with the second port 46. Further, a driving device 296 is connected to lead lines 248a of the first linear voice coil type displacement device 230a, whereas a controller 294 is connected to lead lines 248b, 292 of the second linear voice coil type displacement device 230b.

After completion of the above preparatory steps, the driving device 296 is activated to supply current to the electromagnetic coil 244a, and when the stem 236a is displaced in the direction of arrow B by the generated magnetic field, as shown in FIG. 3, the rod 229 and the ON/OFF valve diaphragm 220 are displaced integrally, and the thick-walled portion 222 is separated from the seat 210, thus establishing communication between the fluid passages 204 and 206. When the coating liquid supply source 180 is activated, the coating liquid is supplied to the coating liquid drip apparatus 182 from the tube 48a and through fluid passages 204, 206, and is dripped onto the semiconductor wafer 182 from the nozzle 184. As a result, a coating layer (not shown) having a desired thickness is formed on the semiconductor wafer 182. At this time, the diaphragm 264 displaces in the direction of arrow A, and the thick-walled and thin-walled portions 266, 268 are fitted against the wall in which the hole 260 is defined, whereby the end of the thick-walled portion 266 and a wall of the fluid passage 206 become substantially flush along a common surface. Accordingly, fluid resistance between the thick-walled portion 266 and the coating liquid introduced to the fluid passage 206 is reduced, and coating liquid is smoothly supplied to the coating liquid drip apparatus.

After a predetermined amount of coating liquid has been applied to the semiconductor wafer 182, the direction of current supplied to the electromagnetic coil 244a by the driving device 296 is switched, and when the stem 236a is displaced in the direction of arrow A, as shown in FIG. 4, the thick-walled portion 222 of the ON/OFF valve diaphragm 220 is displaced and becomes seated on the seat 210, thereby interrupting communication between fluid passages 204 and 206. Accordingly, dripping of coating liquid onto the semiconductor wafer 182 from the nozzle 184 of the coating liquid drip apparatus 186 is halted (see FIG. 3). In this case, because coating liquid immediately preceding that which has dripped onto the semiconductor wafer 182 remains inside the nozzle 184, there is the fear that liquid dripping may occur.

At that point, when current is supplied to the electromagnetic coil 244b from the controller 294, the electromagnetic coil 244b is displaced integrally with the stem 236b and the rod 282. A desired size and continuity time of the force can be adjusted by appropriately adjusting the direction, size and/or polarity of the electric current supplied to the electromagnetic coil 244b.

In this manner, when the thick-walled portion 266 of the diaphragm 264 displaces in the direction of arrow B, a negative pressure is generated by the diaphragm 264, whereby a predetermined amount of coating liquid inside the fluid passage 206 is sucked by action of the negative pressure. As a result, coating liquid inside the nozzle 184 of the coating liquid drip apparatus 186 is returned in the direction of arrow D, whereby unwanted liquid dripping with respect to the semiconductor wafer 182 can be prevented.

In the case that coating liquid is re-supplied to the semiconductor wafer, the driving device 296 is switched again, displacing the stem 236a integrally with the thick-walled part 222 of the ON/OFF valve diaphragm 220 in the direction of arrow B, establishing communication between fluid passages 204 and 206. At this time, when the controller 294 is energized and the stem 236 is displaced in the direction of arrow A, as shown in FIG. 3, the thick-walled portion 266 of the diaphragm 264 is displaced in the direction of arrow A, and coating liquid is pushed out through the fluid passage 206. As a result, coating liquid which was returned from the nozzle 184 in the direction of arrow D when dripping of coating liquid was prevented is again supplied in the direction of arrow C, whereby coating liquid is swiftly dripped again from the nozzle 184 onto the semiconductor wafer 182.

As set forth above, employing the suck back valve 200 according to the second embodiment, because the ON/OFF valve 218 is driven by the second linear voice coil type displacement device 230b, in contradistinction to the conventional technique using pressurized air, the response speed is improved. Further, pipes for interconnecting a directional control valve, or the like, and the suck back valve 200 become unnecessary, so that a system employing the suck back valve 200 can be constructed on a smaller scale.

What is claimed is:

1. A suck back valve comprising:

a valve body having formed therein a first port and a second port, and a fluid passage interconnecting said first port and said second port;

a diaphragm disposed in said valve body;

an electric linear actuator disposed in said valve body, said electric linear actuator comprising a displacement member affixed to an electromagnetic coil, and a stationary permanent magnet rod, said electromagnetic coil being disposed surrounding said permanent magnet rod, said displacement member and said electromagnetic coil being linearly displaceable along said permanent magnet rod by supplying current to said electromagnetic coil; and an attachment rod having one end thereof connected to said displacement member of the electric linear actuator, and another end thereof connected to said diaphragm, said attachment rod being displaced integrally with said diaphragm by energizing said electric linear actuator, wherein by energizing said electric linear actuator, said attachment rod is guided along a guide hole formed in said valve body, and said diaphragm is acted upon thereby to make advancing and retreating movements toward and away from said fluid passage, said retreating movements causing a fluid which flows in said passage to be sucked by displacement of said diaphragm.

2. The suck back valve according to claim 1, wherein said diaphragm comprises a thick-walled portion attached to said rod, and a thin-walled portion formed in surrounding relation to said thick-walled portion and deformable by energization of said electric linear actuator, wherein said thin-walled portion is supported by a support member disposed on said rod through an elastomeric member.

3. The suck back valve according to claim 2, wherein a hole is formed in said valve body communicating with said fluid passage and into which said diaphragm is displaceable, said thick-walled portion and said thin-walled portion of said diaphragm being formed so as to be fitted into a wall formed around said hole, and when said diaphragm is displaced toward said fluid passage, said diaphragm is fitted against said wall formed around the hole, whereby a wall surface of said fluid passage and an end of said thick-walled portion become substantially flush along a common surface.

4. The suck back valve according to claim 1, wherein said electric linear actuator comprises a linear voice coil type displacement device.

5. The suck back valve according to claim 1 further comprising an ON/OFF valve disposed in said valve body for establishing and interrupting communication between said first port and said second port.

6. The suck back valve according to claim 5, wherein said ON/OFF valve includes an ON/OFF valve diaphragm, said ON/OFF valve diaphragm comprising a thick-walled portion attached to a rod and displaceable by energization of said ON/OFF valve, and a thin-walled portion formed in surrounding relation to said thick-walled portion and deformable upon displacement of said thick-walled portion, wherein said thin-walled portion is supported by a support member disposed on said rod through an elastomeric member.

7. The suck back valve according to claim 6, wherein said ON/OFF valve includes an ON/OFF valve electric linear actuator, said ON/OFF valve diaphragm being displaced through said rod upon energization of said ON/OFF valve linear actuator, thereby establishing and interrupting communication between said first port and said second port.

8. The suck back valve according to claim 7, wherein said electric linear actuator comprises a linear voice coil type displacement device.

9. A suck back valve comprising:

a valve body having formed therein a first port and a second port, and having a fluid passage interconnecting said first port and said second port;

a displaceable diaphragm disposed in said valve body facing an interior of said fluid passage;

a linear voice coil type displacement device disposed in said valve body for displacing said diaphragm, said linear voice coil type displacement device comprising a displacement member affixed to an electromagnetic coil, and a stationary permanent magnet rod, said electromagnet coil being disposed surrounding said permanent magnet rod, said displacement member and said electromagnet coil being linearly displaceable along said permanent magnet rod by supplying current to said electromagnetic coil;

means for operatively connecting said diaphragm and said displacement member; and an ON/OFF valve disposed in said valve body for establishing and interrupting communication between said first port and said second port, wherein a fluid which flows in said passage is sucked by displacement of said diaphragm by energizing said linear voice coil type displacement device.

10. The suck back valve according to claim 9, wherein said diaphragm comprises a thick-walled portion attached to a rod displaceable by energization of said linear voice coil displacement device, and a thin-walled portion formed in surrounding relation to said thick-walled portion and deformable upon displacement of said thick-walled portion, wherein said thin-walled portion is supported by a support member disposed on said rod through an elastomeric member.

11. The suck back valve according to claim 10, wherein a hole is formed in said valve body communicating with said fluid passage and into which said diaphragm is displaceable, said thick-walled portion and said thin-walled portion of said diaphragm being formed so as to be fitted into a wall formed around said hole, and when said diaphragm is displaced toward said fluid passage, said diaphragm is fitted against said wall formed around said hole, whereby a wall surface of said fluid passage and an end of said thick-walled portion become substantially flush along a common surface.

12. The suck back valve according to claim 9, wherein said ON/OFF valve includes an ON/OFF valve diaphragm, said ON/OFF valve diaphragm comprising a thick-walled portion attached to a rod displaceable by energization of said ON/OFF valve, and a thin-walled portion formed in surrounding relation to said thick-walled portion and deformable upon displacement of said thick-walled portion, wherein said thin-walled portion is supported by a support member disposed on said rod through an elastomeric member.

13. The suck back valve according to claim 12, wherein said ON/OFF valve includes a linear voice coil type displacement device, said ON/OFF valve diaphragm being displaced through said rod upon energization of said linear voice coil type displacement device, thereby establishing and interrupting communication between said first port and said second port.

* * * * *